(12) United States Patent
van Driesten

(10) Patent No.: US 7,632,370 B2
(45) Date of Patent: Dec. 15, 2009

(54) METHOD OF MAKING A CONTAINER

(75) Inventor: Sjoerd Johannes van Driesten, Bodegraven (NL)

(73) Assignee: Avery Dennison Corporation, Pasadena, CA (US)

( * ) Notice: Subject to any disclaimer, the term of this patent is extended or adjusted under 35 U.S.C. 154(b) by 736 days.

(21) Appl. No.: 11/129,192

(22) Filed: May 13, 2005

(65) Prior Publication Data

US 2005/0252600 A1 Nov. 17, 2005

Related U.S. Application Data

(60) Provisional application No. 60/570,686, filed on May 13, 2004.

(51) Int. Cl.
| | |
|---|---|
| B29C 65/02 | (2006.01) |
| B32B 37/00 | (2006.01) |
| B65B 1/02 | (2006.01) |
| B65B 1/04 | (2006.01) |
| B65B 3/02 | (2006.01) |
| B65B 3/04 | (2006.01) |
| B65B 43/08 | (2006.01) |

(52) U.S. Cl. .................. 156/152; 156/196; 156/212; 264/259; 264/263; 53/558; 53/559

(58) Field of Classification Search .................. 156/196, 156/156, 212, 247, 152; 264/259, 263; 53/558, 53/559

See application file for complete search history.

(56) References Cited

U.S. PATENT DOCUMENTS

| | | | | |
|---|---|---|---|---|
| 3,272,422 A | * | 9/1966 | Miller ...................... 229/123.1 |
| 3,464,842 A | | 9/1969 | Jackstadt ...................... 117/44 |
| 3,764,430 A | * | 10/1973 | Schrenk ...................... 156/150 |
| 3,890,448 A | * | 6/1975 | Ito .............................. 426/126 |
| 4,287,702 A | * | 9/1981 | Corbic ........................ 53/425 |
| 4,350,263 A | * | 9/1982 | Hoffman .................... 220/789 |
| 4,684,025 A | * | 8/1987 | Copland et al. ............ 206/484 |
| 4,786,534 A | * | 11/1988 | Aiken ........................ 428/34.2 |
| 4,818,610 A | | 4/1989 | Zimmerman et al. ........ 428/345 |
| 4,894,259 A | | 1/1990 | Kuller ...................... 427/208.8 |
| 4,945,710 A | * | 8/1990 | Hustad ........................ 53/432 |
| 5,558,913 A | | 9/1996 | Sasaki et al. ............... 428/41.5 |
| 6,135,304 A | * | 10/2000 | Wyslotsky .................. 220/276 |
| 6,145,284 A | | 11/2000 | Eggers ........................ 53/559 |
| 6,736,350 B2 | * | 5/2004 | Lamothe ................ 242/615.21 |
| 7,037,580 B2 | * | 5/2006 | Razavi et al. ............... 428/343 |

FOREIGN PATENT DOCUMENTS

| | | |
|---|---|---|
| EP | 1 026 215 | 8/2000 |
| FR | 2 056 902 | 5/1991 |
| GB | 1 593 986 | 7/1981 |

* cited by examiner

*Primary Examiner*—Philip C Tucker
*Assistant Examiner*—Sing P Chan

(57) ABSTRACT

A method and apparatus (128) for making a plurality of containers (100) from a laminated roll (130) comprising a first layer of thermoformable material (132), a second layer of material (134), and an adhesive layer (136) therebetween. The apparatus (128) comprises a feeding station (142) for the laminated roll (130), a delaminating station (144) whereat the first layer (132) is delaminated from the second layer (134), a thermoforming station (146) whereat receptacles (104) are formed in the delaminated first layer (132), and a relaminating station (150) whereat the second layer (134) is relaminated with the thermoformed first layer (132).

26 Claims, 13 Drawing Sheets

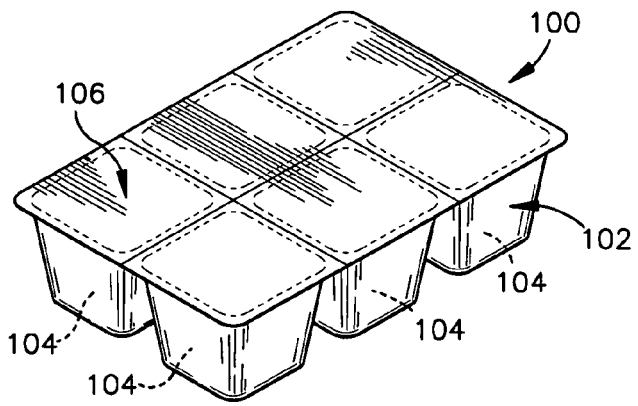
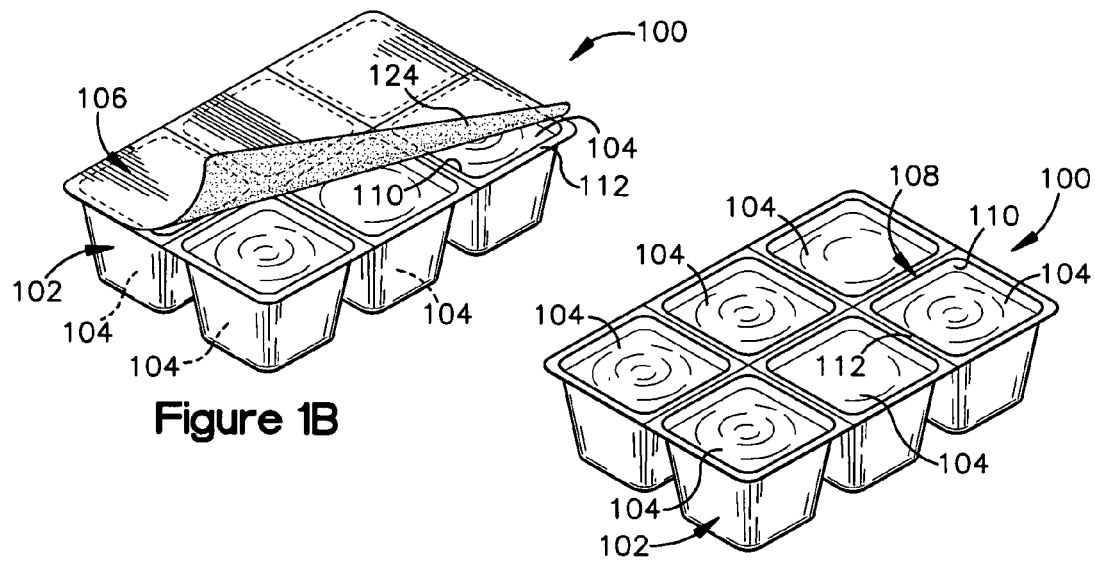
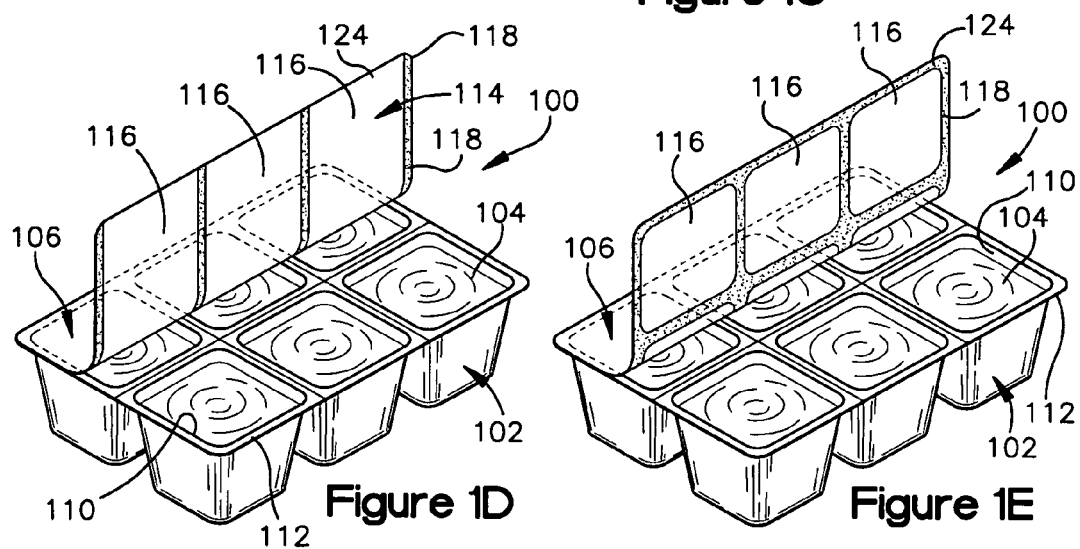
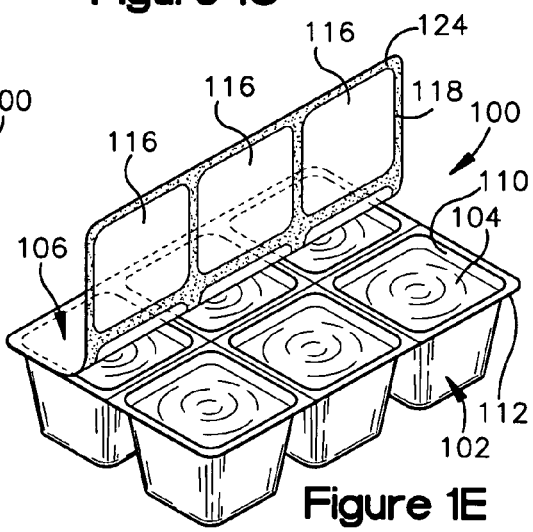

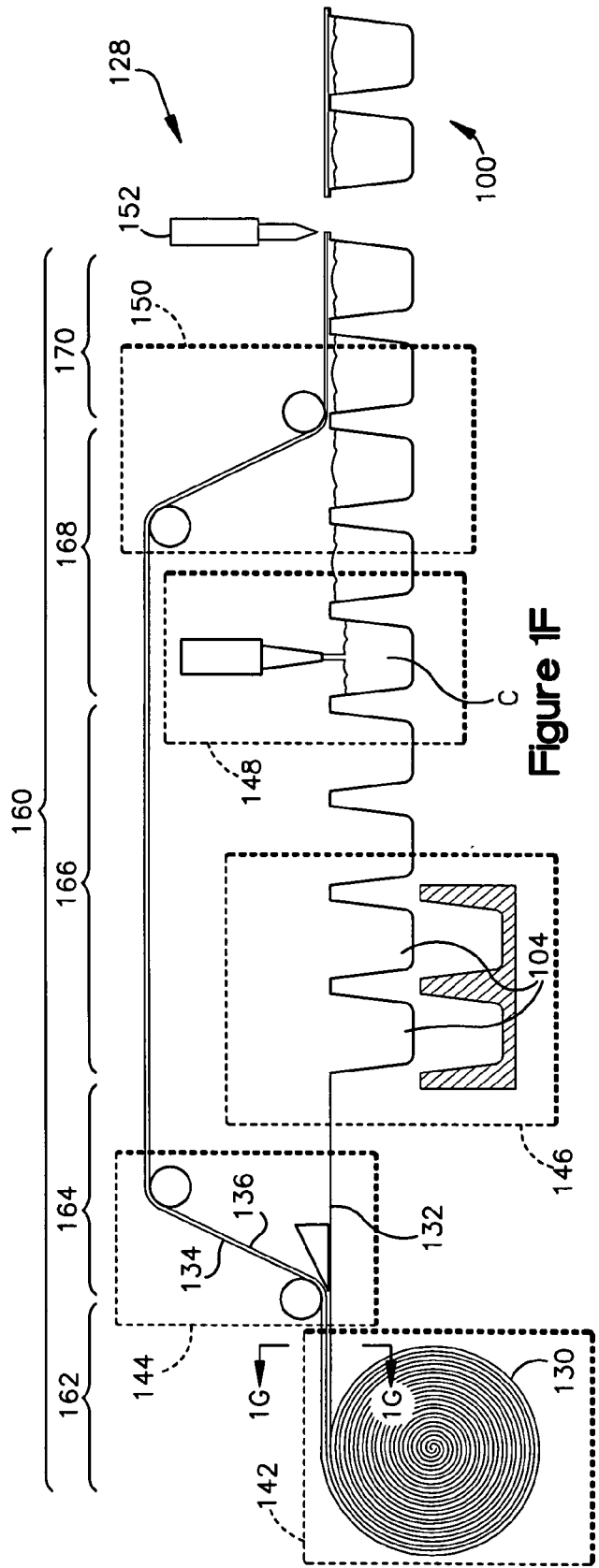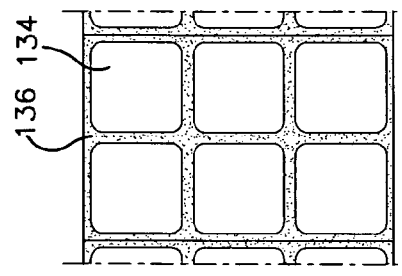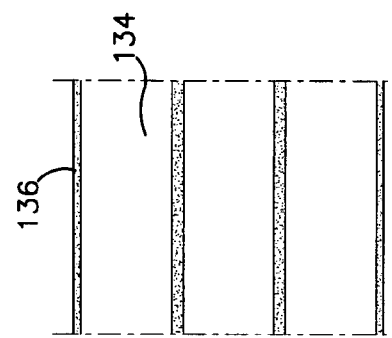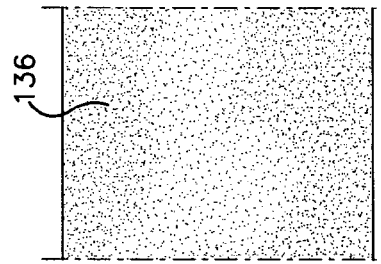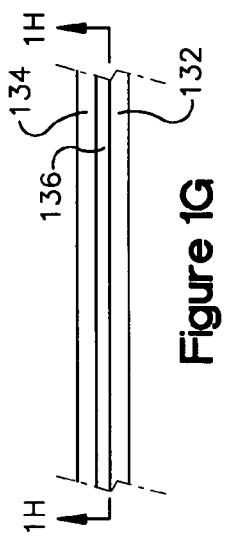

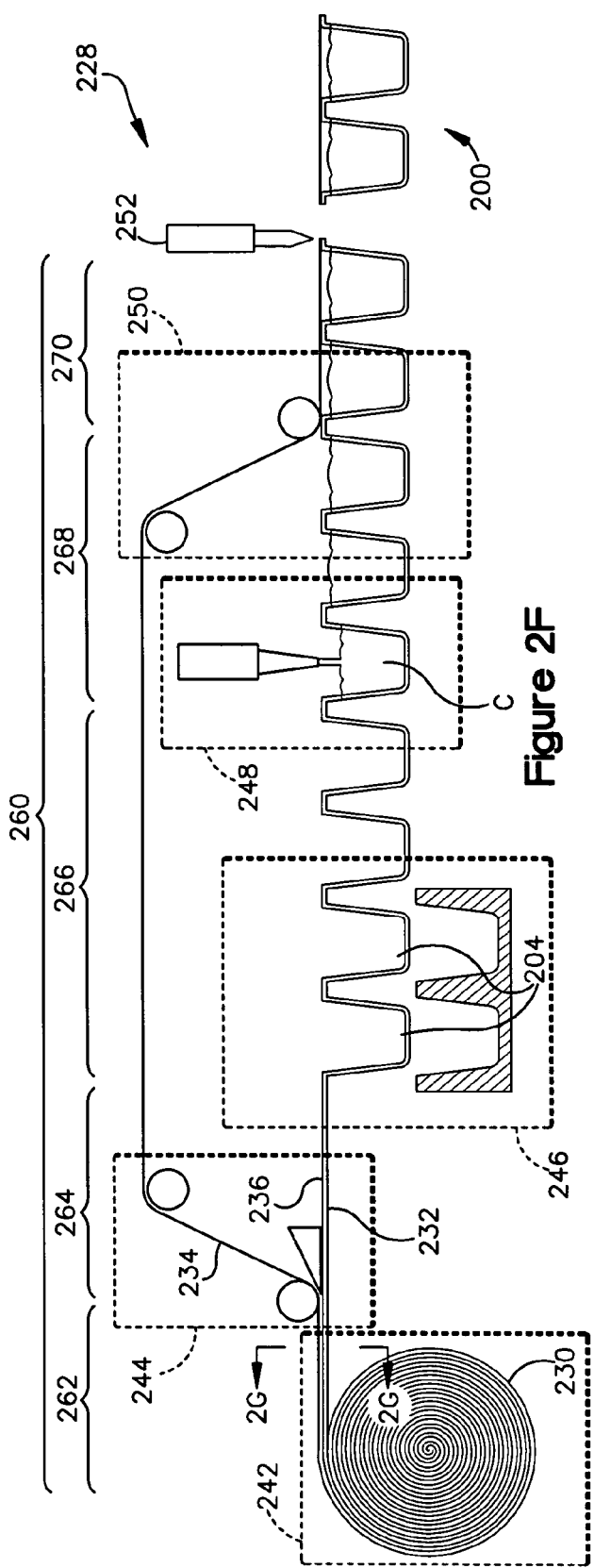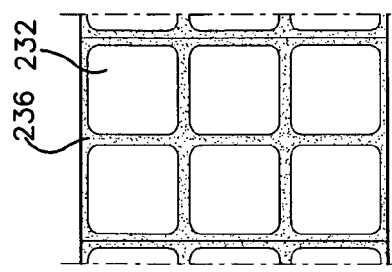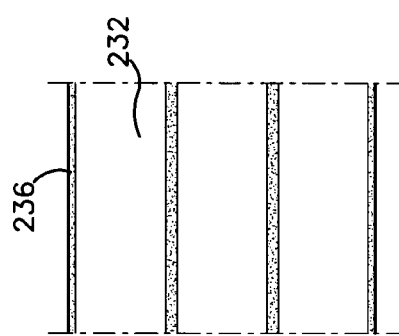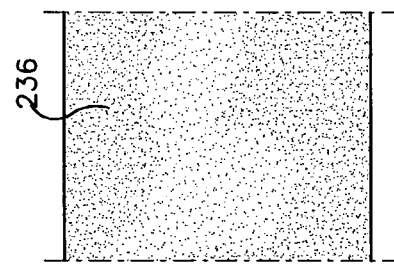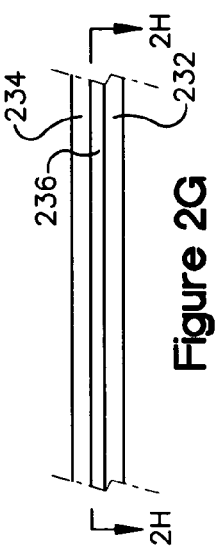

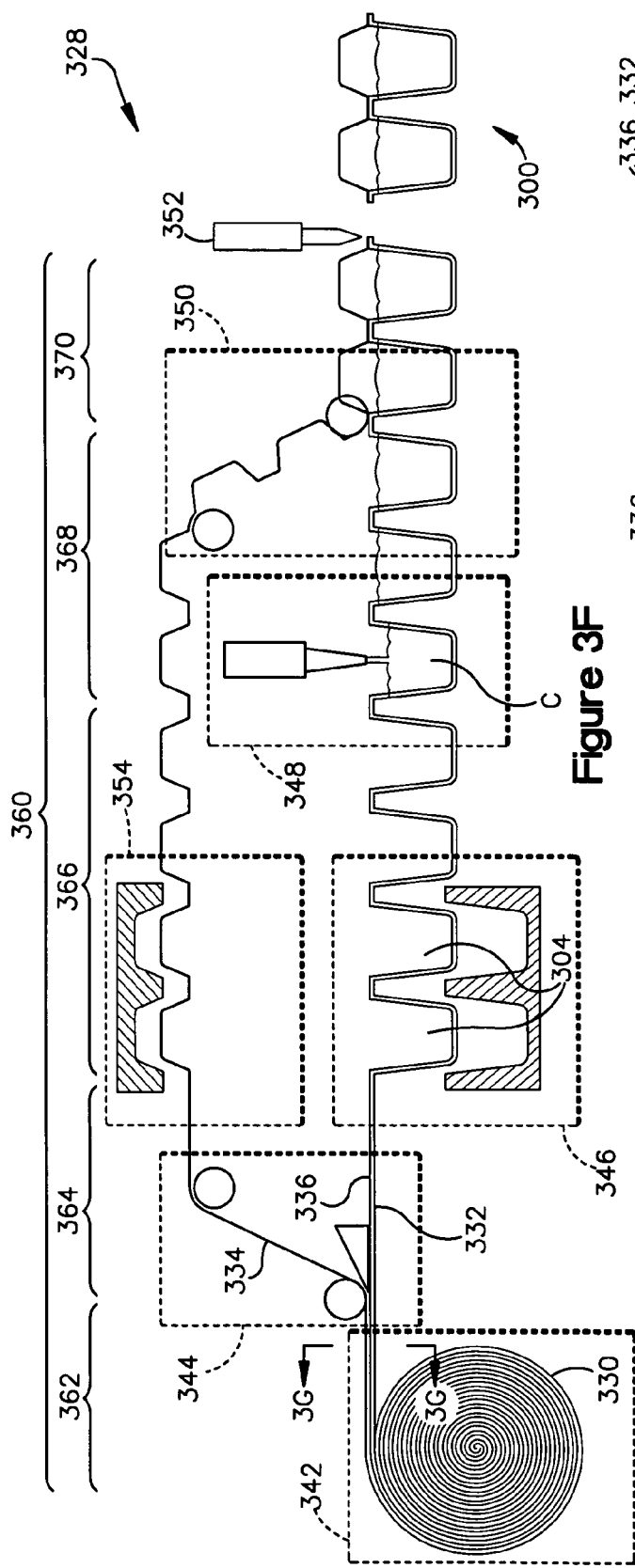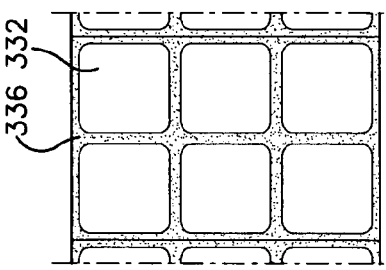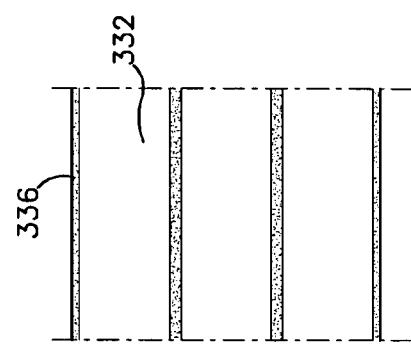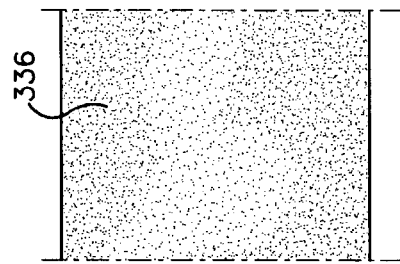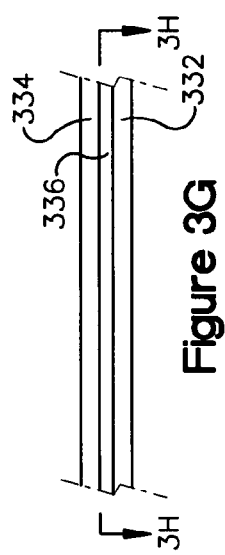

METHOD OF MAKING A CONTAINER

RELATED APPLICATION

This application claims priority under 35 U.S.C. §119(e) to U.S. Provisional Patent Application No. 60/570,686 filed on May 13, 2004. The entire disclosure of this provisional application is hereby incorporated by reference.

FIELD OF THE INVENTION

This invention relates generally as indicated to a method of making a container and, more particularly, to a method of making a container having a first portion having one or more commodity-holding receptacles and a second portion covering the receptacle(s) to contain the commodity therein.

BACKGROUND OF THE INVENTION

A commodity, such as foodstuffs, is typically packed, shipped and/or sold in a container. Such a container commonly includes a first portion defining a receptacle (or a plurality of receptacles) for holding the commodity and a second portion covering the receptacle(s) to contain the commodity therein. During the manufacturing process, the first portion (including the commodity-holding receptacle(s)) must be formed, the receptacle(s) must be filled with the commodity, and the second portion must be formed and positioned to cover the receptacle. Conventionally, this has required separate web feeds for the materials used to form the first and second portions, respectively. Typically, a single web feed is possible only if the container has a clamshell construction with an inter-portion hinge and its base/lid portions are made of the same material. Additionally, conventional container constructions (including clamshell constructions) usually include a latch, lock, or other type of joint between the base/lid portions, especially if the container is intended to be recloseable.

SUMMARY OF THE INVENTION

The present invention provides a container which can be efficiently made with a single web feed, which does not include an inter-portion hinge, which allows base/lid portions to be made from different materials, and which can be recloseable without any inter-portion joints.

More particularly, the present invention provides a method for making a plurality of containers each having a first portion with one or more receptacles and a second portion covering the receptacle(s). The method comprises the steps of feeding a laminated roll (comprising a first layer, a second layer and an adhesive layer therebetween), delaminating the first layer from the second layer, forming (e.g., thermoforming) receptacles in the delaminated first layer, and relaminating the second layer with the formed first layer. The formed first layer forms the containers' first portions and the second layer forms the containers' second portions. These feeding, delaminating, forming, and relaminating steps can be performed at in-line stations.

The starting material for the method of the present invention can be a laminated roll comprising the first layer, the second layer, and an adhesive layer therebetween. An intermediates strip product is formed comprising, sequentially, an upstream laminated region, a delaminated region, a receptacle-formed region, and a downstream relaminated region. If the forming step comprises thermoforming, the final product will comprise a first portion that is thermoformed from a web section having substantially the same length and the same width as the second portion.

These and other features of the invention are fully described and particularly pointed out in the claims. The following description and drawings set forth in detail certain illustrative embodiments of the invention which are indicative of but a few of the various ways in which the principles of the invention may be employed.

DRAWINGS

FIG. 1A is a perspective view of a container 100 according to a first embodiment of the present invention, the container 100 shown with its lid portion 106 in a closed condition.

FIG. 1B is a perspective view similar to FIG. 1A, except that the container 100 is shown with its lid portion 106 partially removed.

FIG. 1C is a perspective view similar to FIG. 1B, except that the container 100 is shown with its lid portion 106 completely removed.

FIG. 1D is a perspective view similar to FIG. 1C, except that the container 100 has a patterned adhesive film 124.

FIG. 1E is a perspective view similar to FIG. 1D, except with a different patterned adhesive film 124.

FIG. 1F is a schematic view of an apparatus 128 for making the container 100 according to the present invention.

FIG. 1G is a cross-sectional view, taken along line 1F-1F in FIG. 1G, of the roll 130 used to make the containers 100.

FIG. 1H is a cross-sectional view, taken along line 1G-1G in FIG. 1G, of a continuous adhesive layer 136 of the roll 130.

FIG. 1I is a cross-sectional view, similar to FIG. 1H, except that the adhesive layer 136 is a non-continuous pattern.

FIG. 1J is a cross-sectional view, similar to FIG. 1I, with a different non-continuous adhesive pattern.

Figure 2A:
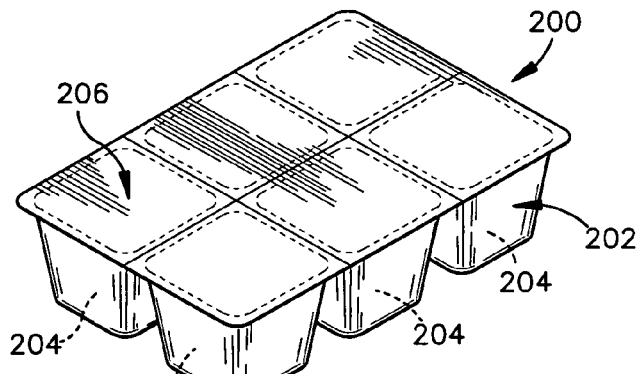

FIG. 2A is a perspective view of a container 200 according to a first embodiment of the present invention, the container 200 shown with its lid portion 206 in a closed condition.

Figure 2B:
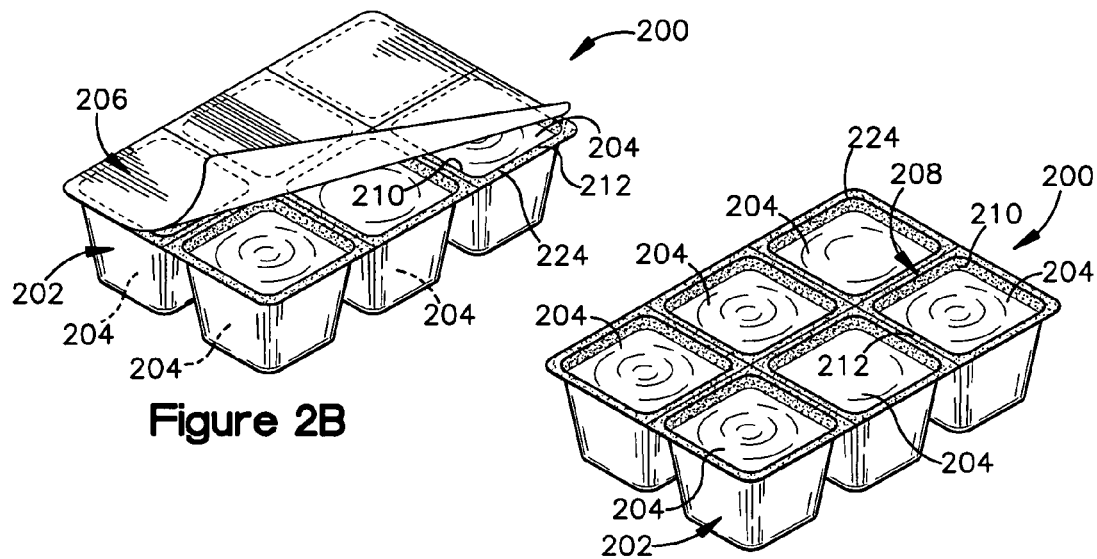

FIG. 2B is a perspective view similar to FIG. 2A, except that the container 200 is shown with its lid portion 206 partially removed.

Figure 2C:
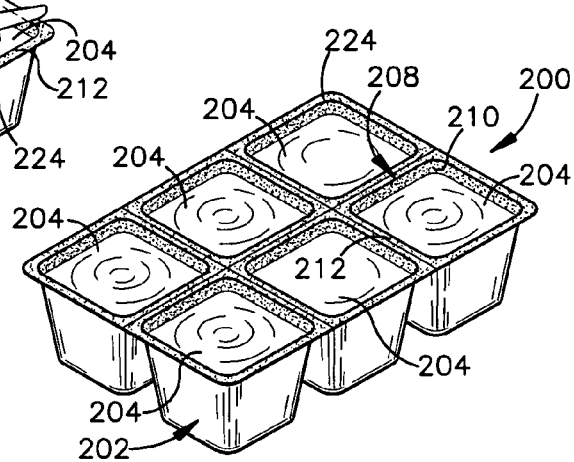

FIG. 2C is a perspective view similar to FIG. 2B, except that the container 200 is shown with its lid portion 206 completely removed.

Figure 2D:
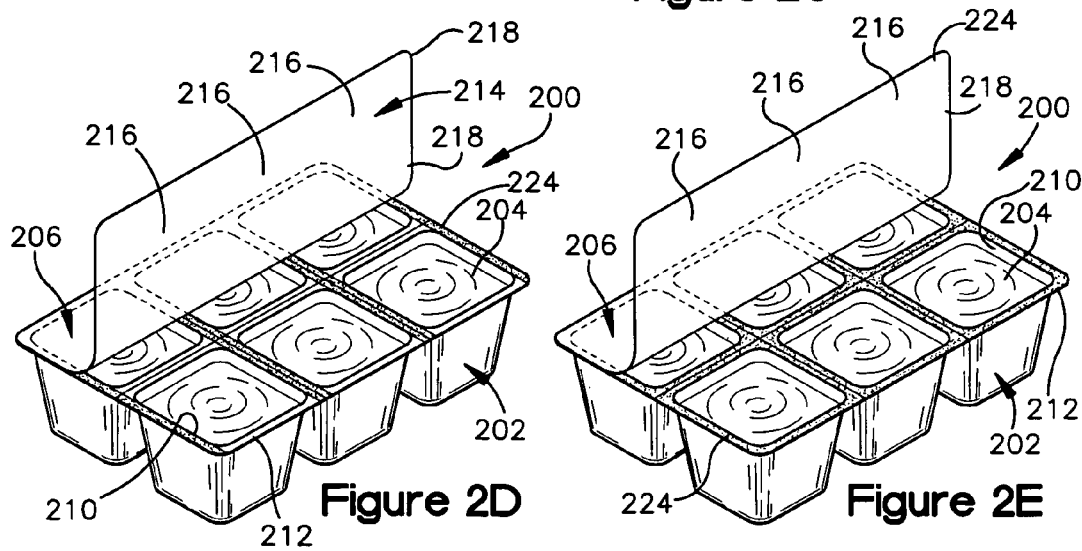

FIG. 2D is a perspective view similar to FIG. 2C, except that the container 200 has a patterned adhesive film 224.

Figure 2E:
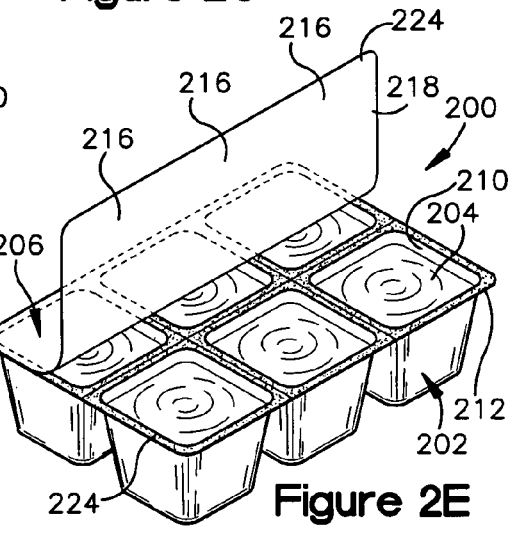

FIG. 2E is a perspective view similar to FIG. 2D, except with a different patterned adhesive film 224.

FIG. 2F is a schematic view of an apparatus 228 for making the container 200 according to the present invention.

FIG. 2G is a cross-sectional view, taken along line 2F-2F in FIG. 2E, of the roll 230 used to make the containers 200.

FIG. 2H is a cross-sectional view, taken along line 2G-2G in FIG. 2E, of a continuous adhesive layer 236 of the roll 230.

FIG. 2I is a cross-sectional view, similar to FIG. 2G, except that the adhesive layer 236 has a non-continuous pattern.

FIG. 2J is a cross-sectional view, similar to FIG. 2I, with a different non-continuous pattern in the adhesive layer 236.

Figure 3A:
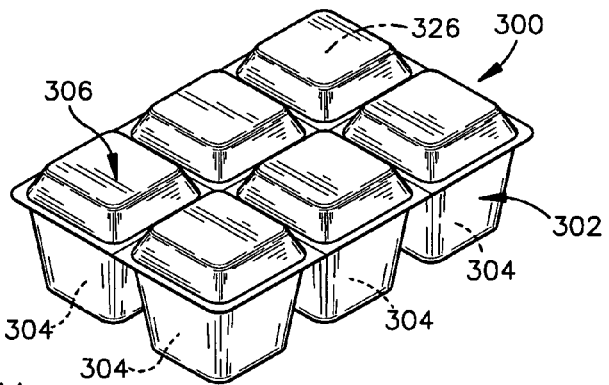

FIG. 3A is a perspective view of a container 300 according to a third embodiment of the present invention, the container 300 shown with its lid portion in a closed condition.

Figure 3B:
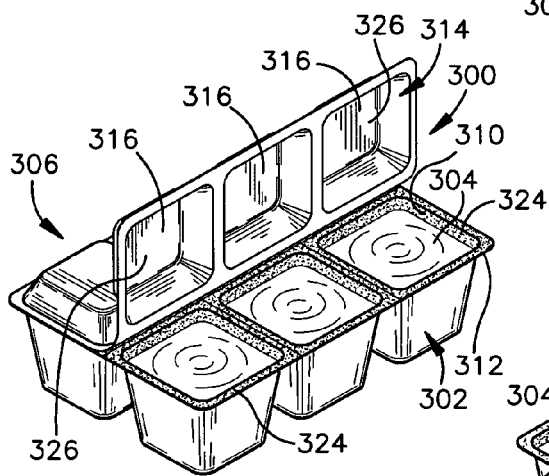

FIG. 3B is a perspective view similar to FIG. 3A, except that the container 300 is shown with its lid portion 306 partially removed.

Figure 3C:
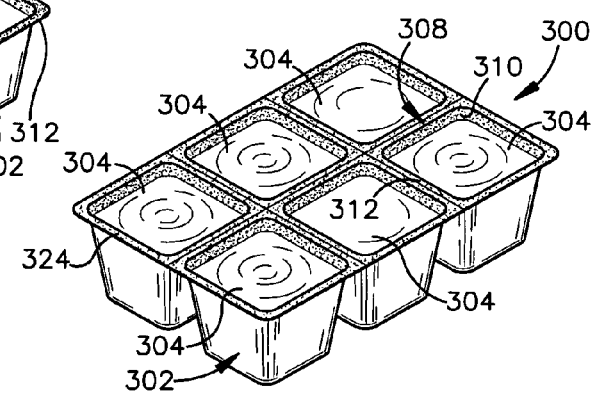

FIG. 3C is a perspective view similar to FIG. 3B, except that the container 300 is shown with its lid portion 306 completely removed.

Figure 3D:
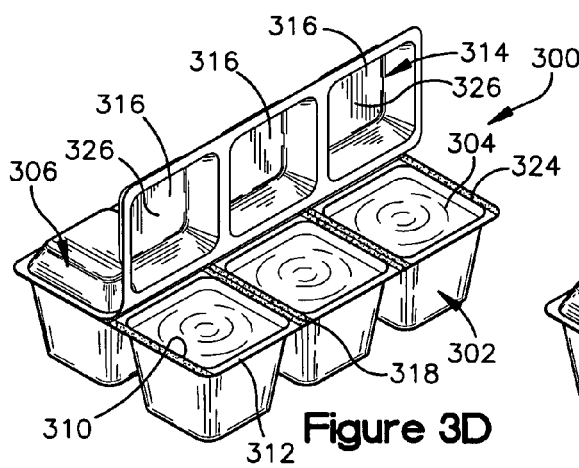

FIG. 3D is a perspective view similar to FIG. 3C, except that the container 300 has a patterned adhesive film 324.

Figure 3E:
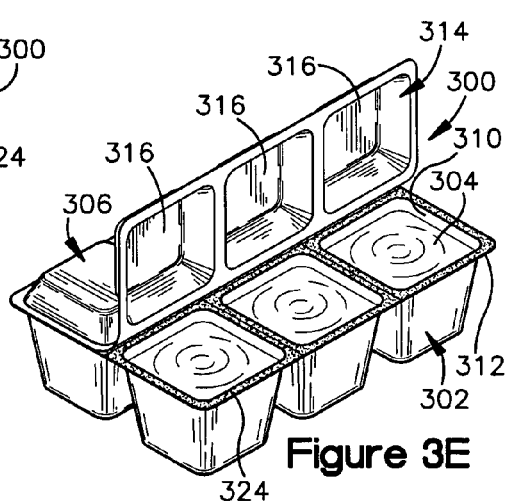

FIG. 3E is a perspective view similar to FIG. 3D, except with a different patterned adhesive film 324.

FIG. 3F is a schematic view of an apparatus 328 for making the container 300 according to the present invention.

FIG. 3G is cross-sectional view, taken along line 3F-3F in FIG. 3E, of the roll 330 used to make the containers 300.

FIG. 3H is a cross-sectional view, taken along line 3G-3G in FIG. 3E, of a continuous adhesive layer 336 of the roll.

FIG. 3I is a cross-sectional view, similar to FIG. 3G, except that the adhesive layer 336 is a non-continuous pattern.

FIG. 3J is a cross-sectional view, similar to FIG. 3I, with a different non-continuous adhesive pattern.

Figure 4A:
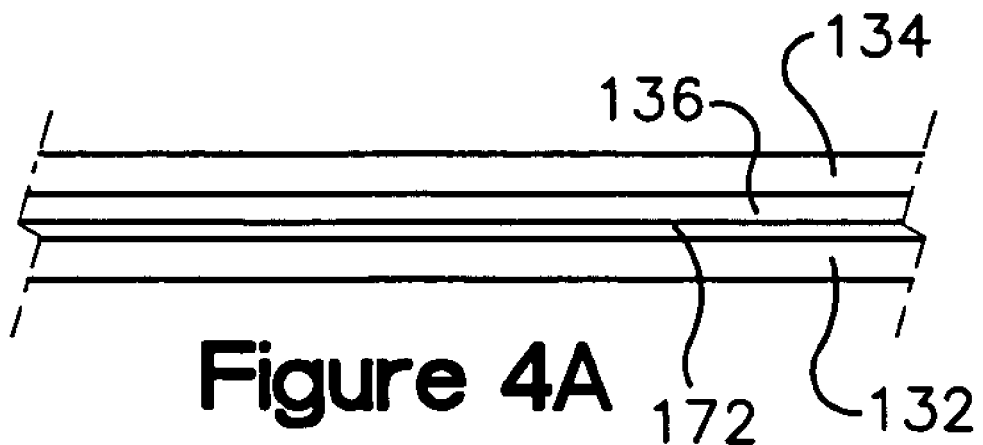
Figure 4B:
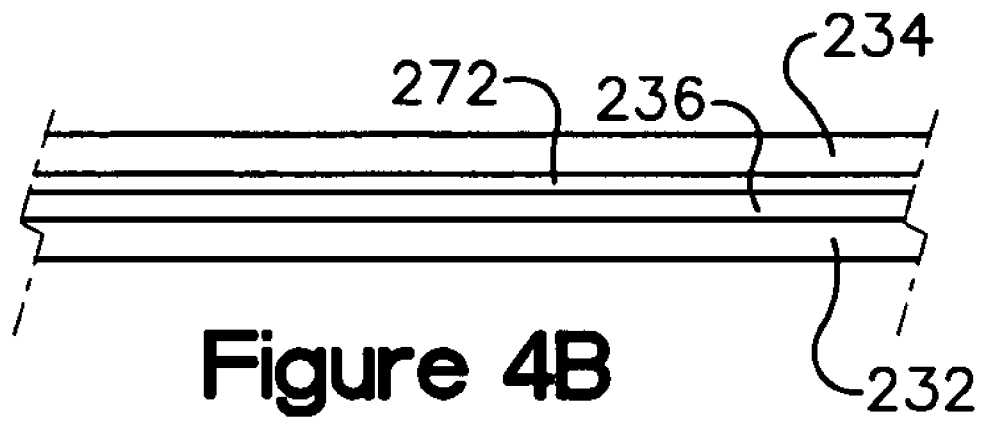
Figure 4C:
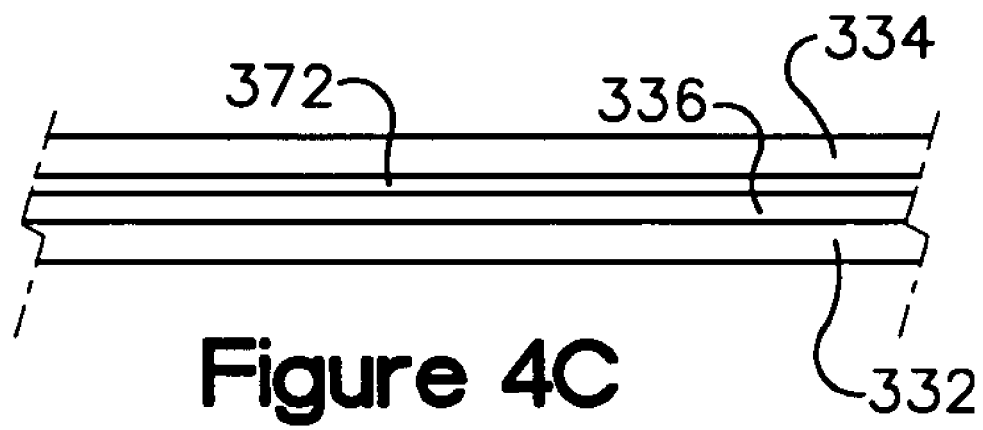

FIGS. 4A, 4B, and 4C are similar to FIGS. 1G, 2G, and 3G, respectively, except that the roll layers also includes a release coating.

Figure 5A:
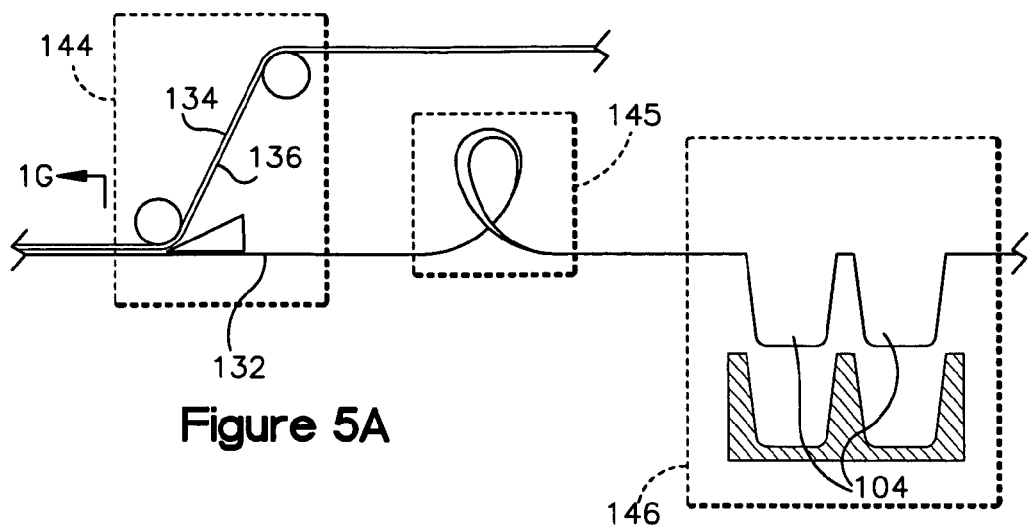
Figure 5B:
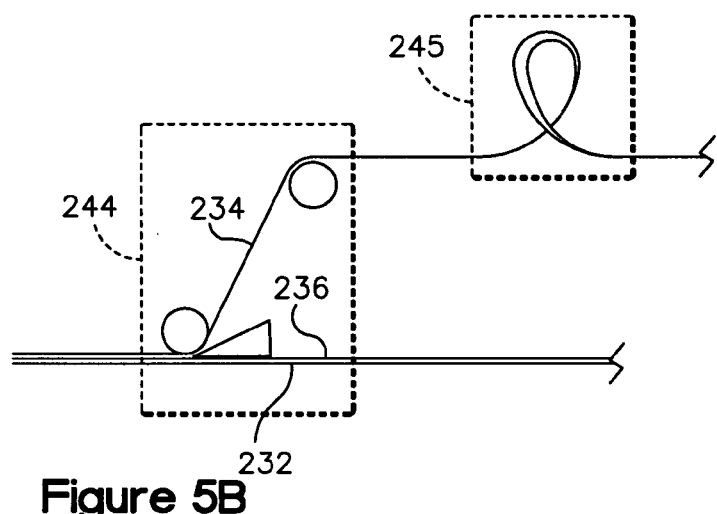
Figure 5C:
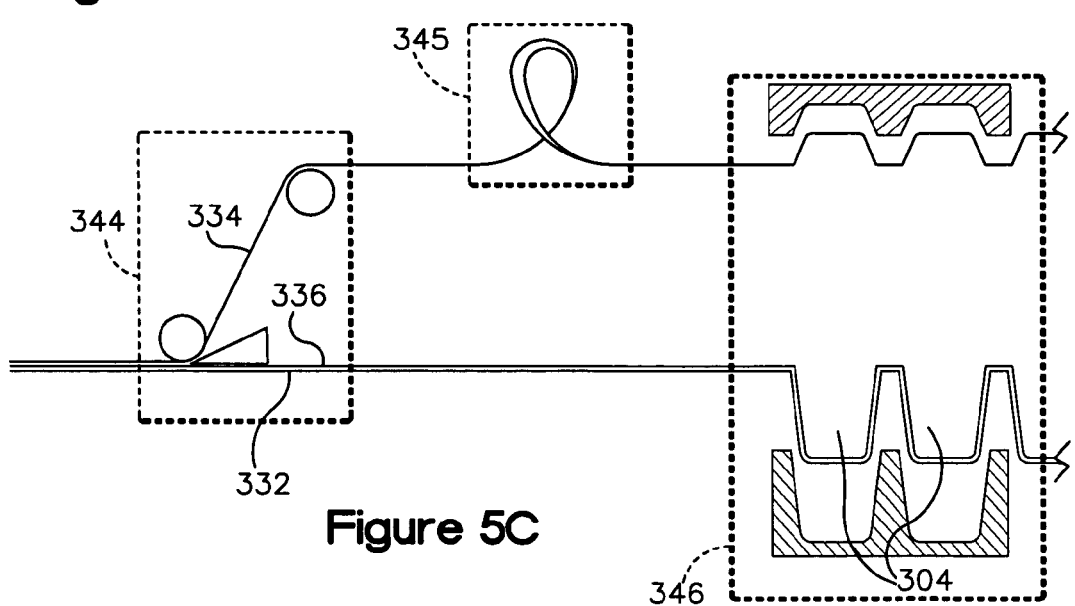

FIGS. 5A, 5B, and 5C are schematic views of turning stations 145, 245, and 345, respectively, for use with the apparatus 128, 228, and 328.

Figure 6A:
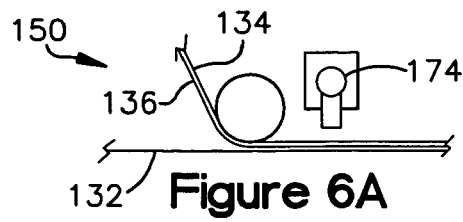
Figure 6B:
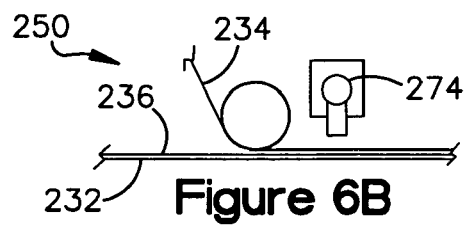
Figure 6C:
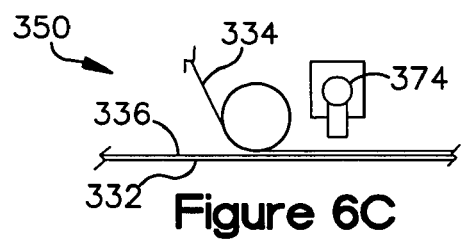

FIGS. 6A, 6B, and 6C are schematic views of modified version of the relaminating stations 150, 250, and 350, respectively, for use with heat-activated adhesives.

Figure 7A:
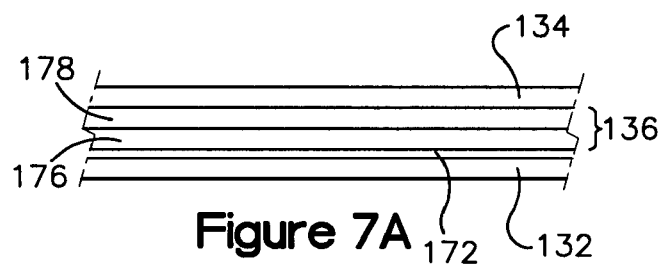
Figure 7B:
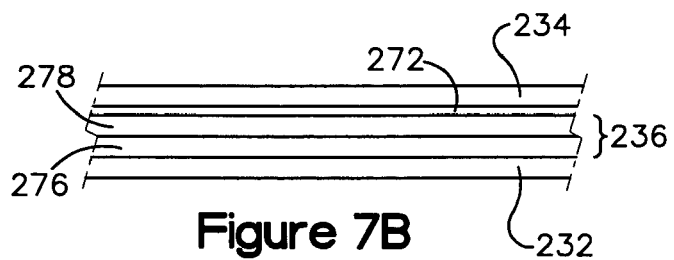
Figure 7C:
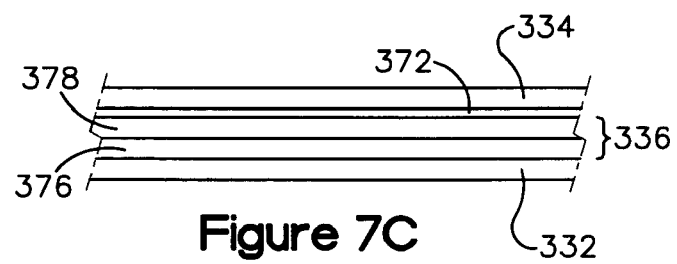

FIGS. 7A, 7B, and 7C are similar to FIGS. 1G, 2G, and 3G, respectively, except that the adhesive layer includes dry peel sublayers and the layers include a release coating.

Figure 8A:
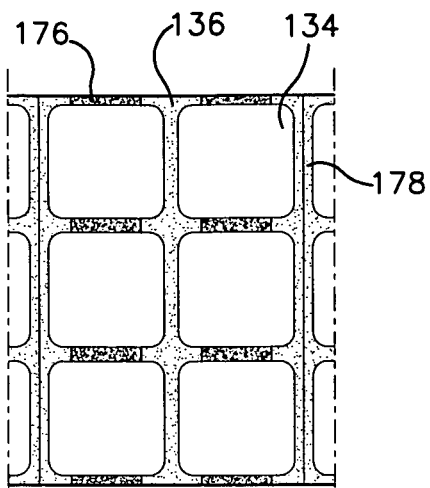
Figure 8B:
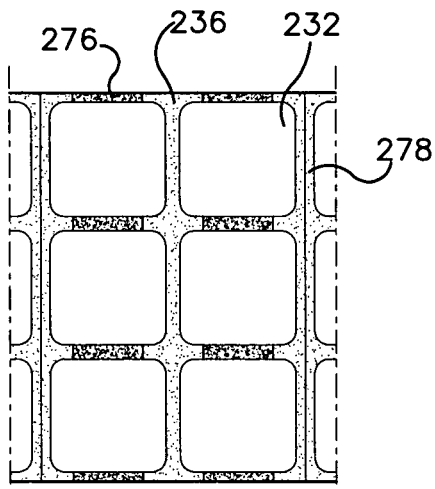
Figure 8C:
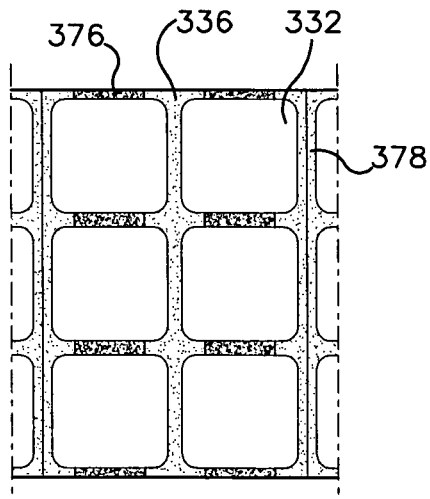

FIGS. 8A, 8B, and 8C are similar to FIGS. 1J, 2J and 3J, respectively, except that the adhesive layer includes heat-activated adhesive patches and pressure-sensitive adhesive patches.

FIGS. 9A-9I are perspective views of modified versions of the containers 100, 200, and 300.

FIGS. 10A-10D are schematic views of a printing step which may be incorporated into the apparatus and/or method at different stages.

Figure 11A:
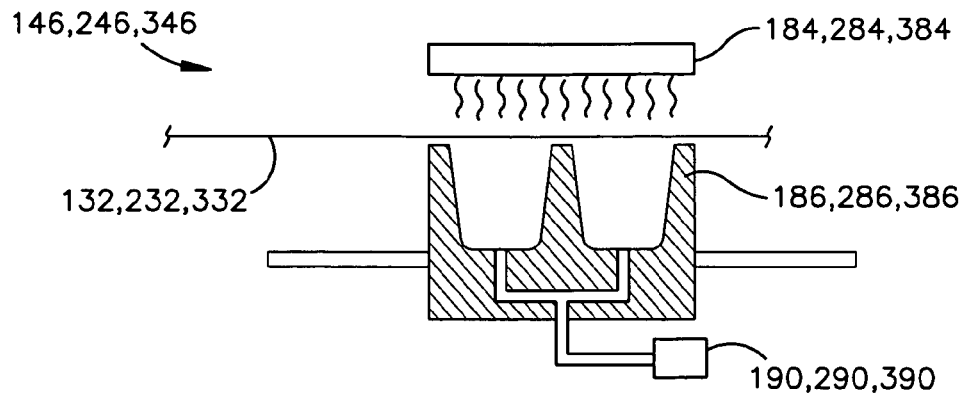
Figure 11B:
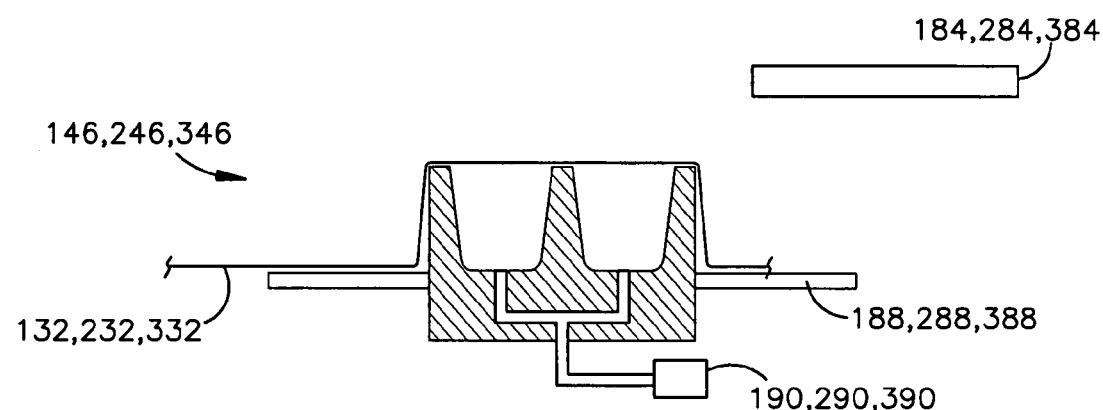
Figure 11C:
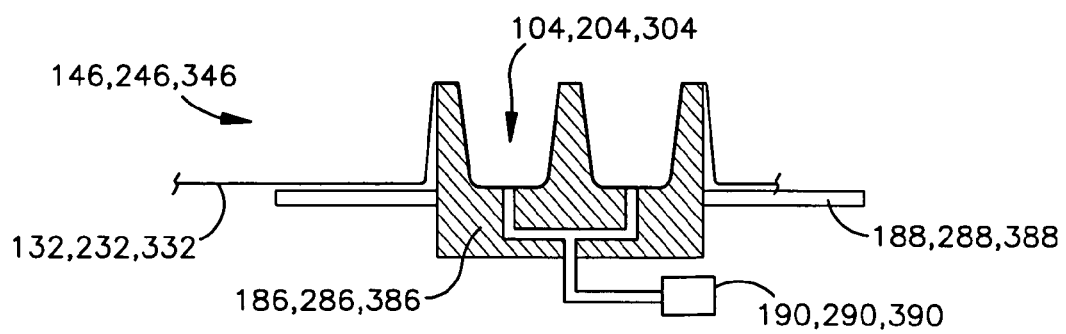

FIGS. 11A-11C are schematic views of the preferred vacuum thermoforming station/step.

DETAILED DESCRIPTION

Referring now to the drawings, and initially to FIG. 1A, a container 100 according to a first embodiment of the invention is shown. The container 100 comprises a first portion 102 having a plurality of receptacles 104 for holding a commodity C, and a second portion 106 overlying the first portion 102 and covering the receptacles 104. As is explained in more detail below, the first portion 102 is thermoformed from a web section having substantially the same length (L) and the same width (W) as the second portion 106.

As is best seen by referring additionally to FIGS. 1B and 1C, the first portion 102 has an inner surface including receptacle-defining areas 110 and receptacle-surrounding areas 112. The second portion 106 has an inner surface positioned adjacent to the inner surface of the first portion 106. The inner surface of the second portion 106 includes areas 116 aligned with the receptacle-defining areas 110 of the first portion 102 and areas 118 aligned with the receptacle-surrounding areas 112 of the first portion 102.

The container 100 further comprises an adhesive film 124 coated on the inner surface of the second portion 106 whereby it is positioned between the inner surfaces of these portions. The adhesive film 124 connects the receptacle-surrounding areas 112 of the first portion 102 to the aligned areas 118 of the second portion 106. The second portion 106 can be partially removed (FIG. 1B) or completely removed (FIG. 1C) from the first portion 102 to uncover one or more of the receptacles 104. With particular reference to a partial removal of the second portion 106, it can include a perforated seam or line (not shown) that allows a designed tearing of the portion 106 when uncovering the receptacles 104.

In the container 100 shown in FIGS. 1A-1C, the adhesive film 124 completely covers, or is continuous relative to, the inner surface of the second portion 106. Thus, the film 124 covers both the areas 116 aligned with the receptacle-defining areas 110 of the first portion 102 and the areas 118 aligned with the receptacle-surrounding areas 112 of the first portion 102. Alternatively, as shown in FIGS. 1D and 1E, the adhesive film 124 can be applied in a pattern on the inner surface of the second portion 106. The pattern can comprise longitudinal adhesive stripes coinciding with the areas 118 aligned with the receptacle-surrounding areas 112 of the first portion 102 (FIG. 1D) or it can comprise an adhesive grid covering all of the areas 118 aligned with the receptacle-surrounding areas 112 of the first portion 102 (FIG. 1E).

Referring now to FIG. 1F, an apparatus 128 for making a plurality of the containers 100, from a single laminated roll 130, is schematically shown. The roll 130 has a width (W) corresponding to the width of the container's second portion 106 (or multiples thereof if multiple rows of containers 100 are being formed). As is best seen by referring briefly to FIG. 1G, the roll 130 comprises a first layer 132, a second layer 134, and an adhesive layer 136 therebetween. If the container 100 is intended to have a continuous adhesive film 124 (FIG. 1C), the adhesive layer 136 would be continuous as shown in FIG. 1H. If the container 100 is intended to have a patterned adhesive film 124 (FIG. 1D and FIG. 1E), the adhesive layer 136 would be patterned as shown in FIGS. 1I and 1J. If the second portion 106 is intended to have a tear-away feature, as discussed above, the second layer 134 could be provided with the perforated seam or line.

Referring now back to FIG. 1F, the apparatus 128 comprises a single feed station 142, a delaminating (or separating) station 144, a forming station 146, a filling station 148, a relaminating (or rejoining) station 150, and a cutting station 152. The feed station 142 supplies the leading sections of the roll 130 to the delaminating station 144 which delaminates (separates) the first layer 132 from the second layer 134. In this embodiment of the invention, the adhesive layer 136 remains with second layer 134 and thus is also delaminated from the first layer 132.

The receptacles 104 are then formed in the delaminated first layer 132 at the forming station 146. Preferably, receptacles 104 corresponding to the desired container construction are thermoformed into a length (L) of the first layer 132, which is substantially equal to the desired length (L) of the second portion 106 (or multiples thereof if multiple columns of containers 100 are being formed). (As was indicated above, the roll 130 has a width (W) corresponding to the width of the container's second portion 106.) The forming step is preferably performed so only the thickness, or gauge, of the being-formed section of the first layer 132 is changed to form the receptacles 104, not its length or width.

The receptacles 104 are thereafter filled with the commodity C at the filling station 148. After the receptacles 104 are filled, the second layer 134, and the adhesive layer 136 in this embodiment, are relaminated to the first layer 132 at the relaminating station 150. Because the forming station 146 (or corresponding forming step) did not significantly change the length or width of the thermoformed sections of the first layer 132, sections of the second layer 134 are reunited with the same sections of the first layer 132 to which they were originally laminated.

Thereafter, the cutting station 152 transversely cuts the relaminated layers 132 and 134 (and the adhesive layer 136 therebetween) at an interval equal to the length (L) to produce a plurality of the containers 100.

The apparatus 128 (and corresponding method) creates an intermediate strip product 160 extending from upstream of the delaminating station 144 to downstream of the relaminating station 150 (and upstream of the cutting station 152). This continuous strip product 160 can be viewed as comprising an upstream region 162, sequential intermediate regions 164, 166, 168, and a downstream region 170. The first layer 132 and the second layer 134 are not yet delaminated in the upstream region 162. The second layer 134 is delaminated from the first layer 132 in the intermediate region 164, a series of receptacles 104 are formed (e.g., thermoformed) in the first layer 132 in the intermediate region 166, and the receptacles 104 are filled with the commodity C in the intermediate region 168. The second layer 134 is relaminated with the first layer 132 in the downstream region 170 to cover the receptacles 104 and the commodity C contained therein. In this embodiment of the invention, the adhesive layer 136 is positioned with the second layer 134 in the intermediate regions 164, 166, 168 of the strip product 160.

Referring now to FIGS. 2A-2J, a container 200, an apparatus 228, a roll 230, and a strip product 260 according to a second embodiment of the invention are shown. (These items are similar to the analogous items in the first embodiment of the invention whereby like reference numerals, with "100" added thereto, are used to designate like parts.) In the container 200 (FIGS. 2A-2C), the adhesive film 224 remains on the inner surface of the first portion 202 during removal of the second portion 206 (FIGS. 2B and 2C). In the laminated roll 230, the adhesive layer 236 is coated on the first layer 232 whereby it remains therewith during delaminating, receptacle-forming, and receptacle-filling. (FIG. 2F.) Thus, in the strip product 260, the adhesive layer 236 is positioned with the second layer 234 in the intermediate regions 164, 166, 168. The adhesive film 224 can be a continuous film covering both the receptacle-defining areas 210 and the receptacle-surrounding areas 212 (FIGS. 2B and 2C), or a patterned film covering only the receptacle-surrounding areas 212 (FIG. 2D and FIG. 2E). Likewise, and correspondingly, the adhesive layer 236 in the roll 230 can be continuous (FIG. 2H) or patterned (FIG. 2I and FIG. 2J).

Referring now to FIGS. 3A-3H, a container 300, an apparatus 328, a roll 330, and a strip product 360 according to a third embodiment of the invention are shown. (These items are similar to the analogous items in the second embodiment whereby like reference numerals, with "100" added thereto, are used to designate like parts.) In this embodiment of the invention, both the first portion 302 and the second portion 306 have receptacles 304 and 326, respectively, formed therein. The receptacles 304 in the first portion 302 can be (but need not be) aligned with the receptacles 326 in the second portion 306. The apparatus 328 includes a second forming station 354 (preferably a thermoforming station) which forms the receptacles 326 in the second layer 334 after the delaminating station 344 but prior to the relaminating station 350. The strip product 360 includes receptacles 326 in the second layer 334 in the intermediate regions 366/368 and the downstream region 370.

The first layer 132/232/332 (and thus the first portion 102/202/302) is preferably thermoformed and can be made of a thermoplastic resin. Examples of such resins include polyethylenes (high, mid and low density), polypropylenes, polystyrenes, ABS resins, methacrylates, vinyl chlorides, polyethylene terephthalates, polybutylene terephthalates, AS resins, EVA resins, cellulose acetates, polycarbonates, polyamides, polyacetal resins, modified polyphenylene oxides, polysulfone resins and the like. If the portion 102/202/302 is to be transparent or white translucent, resins such as polyethylenes, polypropylenes, polystyrenes, ABS resins, methacrylates, vinyl chlorides, polyethylene terephthalates, polybutylene terephthalates and cellulose acetates can be used.

These thermoplastic resins can be used alone or in the form of a mixture of two or more thereof, including homopolymers, copolymers, terpolymers and blends thereof.

In the first and second embodiments, the second layer 134/234 (and thus the second portion 106/206) can be made of any suitable material, such as paper, foils, or polymer films (e.g., polyethylene, polypropylene, polyvinyl chloride, polystrene, acetate, etc.). Depending upon the desired application, the material can be transparent, white, colored, radiant, solid, laminated, metalized, holographic, impregnated, luminescent, and/or laser printable. In the third embodiment, the second layer/portion 334/306 is thermoformed, whereby the material should be a thermoplastic resin, such as the ones listed above for the first layer/portion. In the third embodiment (and also the first and second embodiments for that matter), the first and second layers can be made of the same, or different, materials.

The adhesive layer 136/236/336 (and thus the adhesive film 124/224/324 in the completed container 100/200/300) can comprise a pressure sensitive adhesive (PSA), such as a silicone-based PSA, a rubber-based PSA, and an acrylic-based PSA, and can be provided as a hot melt, an emulsion, an aqueous dispersion, a solvent solution, or a film membrane. The pressure sensitive adhesives can be removable, whereby the container 100/200/300 can be re-opened and re-closed, or they can be permanent, whereby the container 100/200/300 is only intended to be opened once.

As was noted above, the adhesive layer 136/236/336 can comprise a continuous cover of adhesive (FIGS. 1H, 2H, 3H), a striped pattern of adhesive (FIGS. 1I,2I,3I), or a grid pattern of adhesive (FIG. 1J, 2J, 3J.) The continuous cover of adhesive (FIGS. 1H, 2H, 3H) can be applied by multi-layer coextrusion with, or extrusion coating onto, the relevant layer 134/232/332, if the adhesive is a hot-melt, or by conventional curtain and other coating techniques if the adhesive is an emulsion, or an aqueous dispersion. Improved torsion stiffness (when compared to, for example, a clamshell container design) is obtained by the intimate bond between the layers 132/232/332 and 134/234/334. A higher torsion stiffness may allow first layer material reduction, more pack robustness during transport and handling, and/or more convenience while handling.

With the continuous adhesive arrangement, the contents of the receptacles 104/204/304 will come into contact with the adhesive. In some cases, this might not present any sanitary or other issues and, in fact, might even be desirable in certain circumstances. For example, if the commodity C comprises small particles, such adhesive contact can help contain the particles within the receptacles 204/304 of the containers 200/300.

If such adhesive contact is not desirable, the patterned adhesive layers 236 and 336 (FIGS. 1I, 1J, 2I, 2J, 3I, and 3J) can be used. The striped adhesive pattern (FIGS. 1I, 2I, 3I) is easy to apply in the machine direction with conventional stripe-coating techniques and thus this is a very cost effective way to create non-stick receptacle areas. However, this leaves the transverse edges of the container 100/200/300 without adhesive whereby the second portion 106/206/306 will not be completely sealed to first portion 102/202/302. (See FIGS. 1D, 2D, and 3D.) This problem is overcome by the grid adhesive pattern (FIGS. 1J, 2J, 3J) as the transverse edges of the container 100/200/300 will also be sealed. (See FIGS. 1E, 2E, and 3E.) However, such a two-dimensional pattern must be applied by screen printing or other complicated and sometimes expensive techniques.

The adhesive layer 136/236/336 and the layer 134/232/332 from which the adhesive layer is separated, must be capable of delamination and also relamination. Thus, the same layers that must be separated upstream must also be capable of rebonding downstream to complete the process. To this end, a release coating 172/272/372, such as a silicone coating, may be provided between the adhesive layer 136/236/336 and the layer 134/232/332 from which the adhesive layer is separated during delamination. (See FIGS. 4A-4C.) Additionally or alternatively, the apparatus 128/228/328 can include a turning station 145/245/345 downstream of the delaminating station 144/244/344. (See FIGS. 5A-5C.) In this manner, one surface of the separating layer 134/232/332 (e.g., the top surface of layer 134, the bottom surface of layer 232, and the bottom surface of layer 332) can be adapted for delamination from the adhesive layer 136/236/336 and the other surface of the separating layer 134/232/332 (e.g., the bottom surface of layer 134, the top surface of layer 232, and the top surface of layer 332) can be adapted for bonding to the adhesive layer 136/236/336 during relamination. In the apparatus 128, the turning station 145 would be situated between the delamination station 144 and the forming station 146. In the apparatus 228, the turning station 245 would be situated between the delamination station 244 and the relamination station 250. In the apparatus 328, the turning station 345 would be situated between the delamination station 344 and the forming station 346.

Instead of a pressure-sensitive adhesive, the adhesive layer 136/236/336 (and thus the adhesive film 124/224/324 in the completed container 100/200/300) can comprise a heat-activated adhesive. In this case, the relaminating station 150/250/350 could include a heating stamp 174/274/374 (or other suitable device) to activate the adhesive during relamination. (See FIGS. 6A-6C.) The advantage of heat-activated adhesive is that only the desired areas can be heated thereby allowing avoidance of the commodity-containing receptacles 104/204/304. Also, the inner surfaces of the layers will not be "sticky" prior to the relamination, which might be desirable in certain manufacturing environments. However, the layer 136/236/336 will not initially provide any adhesive adherence between the first layer 102/202/302 and the second layer 106/206/306, which might create feed problems in high speed feed situations.

To provide initial layer-to-layer adherence, the adhesive layer 136/236/336 (and thus the adhesive film 124/224/324 in the completed container 100/200/300) can comprise a dry peel adhesive which is capable of being "reactivated" after delamination. The dry peel adhesive disclosed in EP1165715 and/or WO0046316 is capable of such post-lamination reactivation with heat. With this adhesive, the layer 136/236/336 would comprise a non-PSA sublayer 176/276/376 and a PSA sublayer 178/278/378 that attaches, or "piggy-backs" the non-PSA sublayer 176/276/376 to the relevant layer 134/232/332. A release coating 172/272/372 would also be provided between the non-PSA sublayer 176/276/376 and the other layer 132/234/334. (See FIGS. 7A-7C). This type of adhesive is commonly used for coupons or other items which are required to initially adhere to a surface but, after being peeled therefrom are desirably "non-sticky" and dry to the touch. In any event, the dry peel adhesive provides adherence between the relevant roll layers, provides non-sticky dry surfaces after delamination, and can be heat reactivated for relamination.

It is also possible for the adhesive layer 136/236/336 (and thus the adhesive film 124/224/324 in the completed container) to comprise both heat-activated adhesive patches 176/276/376 and pressure-sensitive adhesive patches 178/278/378. For example, as shown in FIGS. 8A-8C, the heat-activated adhesive patches 176/276/376 could occupy only certain sections on the receptacle-surrounding areas 112/212/312, while the pressure-sensitive adhesive patches 178/278/378 could fill in the rest of the grid pattern. This adhesive-application pattern can be accomplished by stripe coating the pressure-sensitive adhesive patches 178/278/378 onto a heat-activated adhesive film whereby the "uncoated" sections of this film form the heat-activated adhesive patches 176/276/376.

It may be noted that the combination of heat-activated adhesive patches and pressure-sensitive adhesive patches can be employed to provide the container 100/200/300 with the advantages inherent to each adhesive type. Specifically, for example, the heat-activated adhesive patches 176/276/376 can provide the container 100/200/300 with a tamper-evident feature (since opening of the heat-activated adhesive patches would be easily discernable), while the pressure-sensitive adhesive patches 178/278/378 can provide the container 100/200/300 with the ability to be reopened and reclosed (if the pressure-sensitive adhesive is releasable).

Figure 9A:
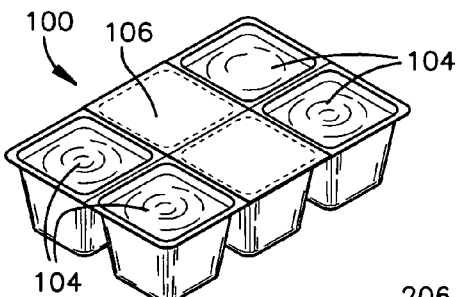
Figure 9C:
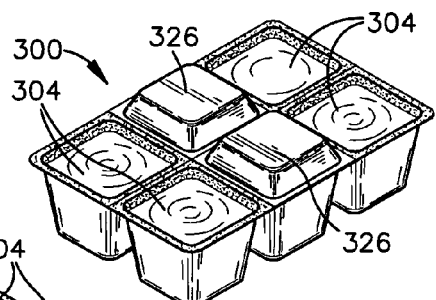
Figure 9B:
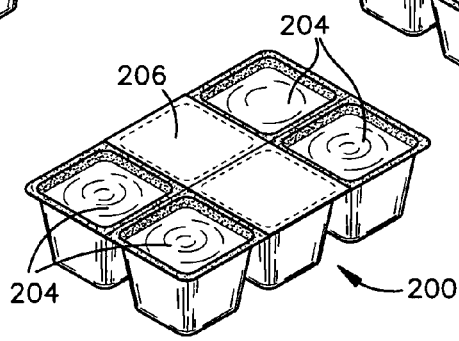
Figure 9D:
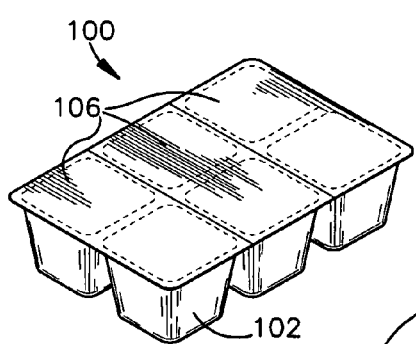
Figure 9F:
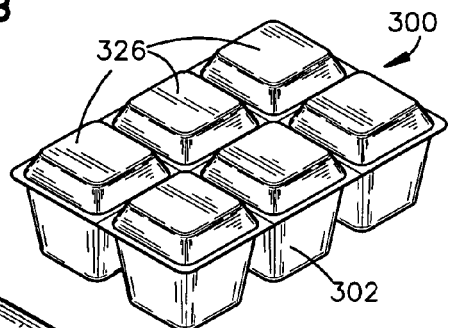
Figure 9E:
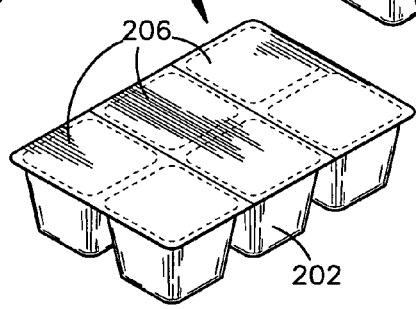
Figure 9G:
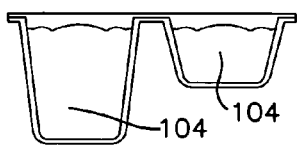
Figure 9H:
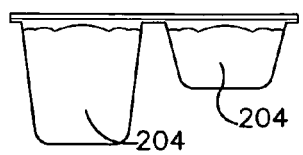
Figure 9I:
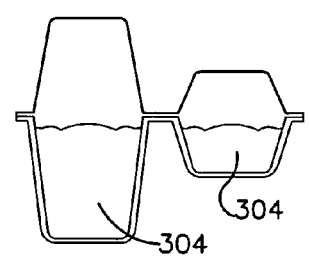

The layers 132/232/332 and 134/234/334 (and the release coating 172/272/372, if applicable) can be of the same width, as this will result in the first portion 102/202/302 and the second portion 106/206/306 being of substantially the same width (W). It is expected that such equal-width embodiments of the invention will be the most manufacturing friendly and commercially usable. That being said, different-width layers are certainly possible with, and contemplated by, the present invention. For example, a narrow width second layer 134/234/334 could be used to provide a container 100/200/300 wherein only certain receptacles 104/204/304 are covered. (FIGS. 9A-9C.) Also, a single web can be replaced with a plurality of webs to provide "separate" compartments and/or lids. (FIGS. 9D-9F.) Additionally or alternatively, and as discussed below, the preferred forming technique allows container constructions wherein the receptacles 104/204/304 are not of the same size and/or shape. (FIGS. 9G-9I.)

Figure 10A:
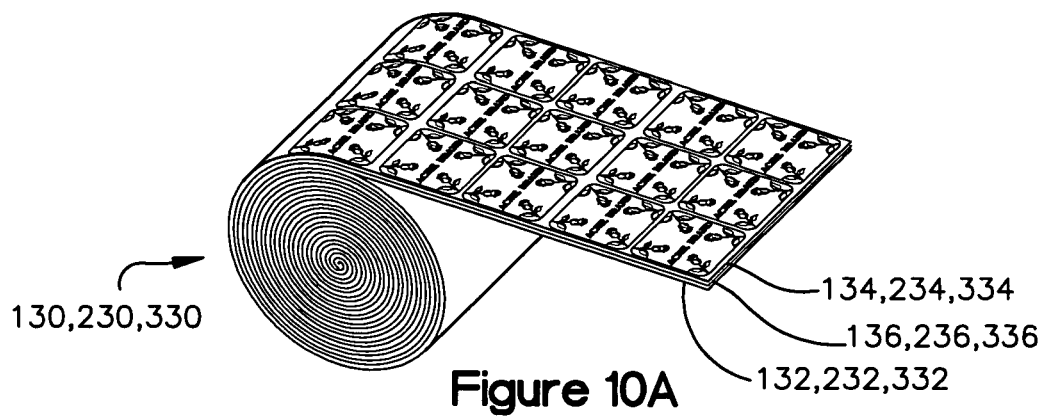
Figure 10B:
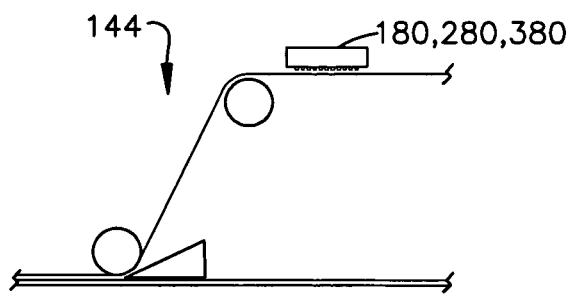
Figure 10C:
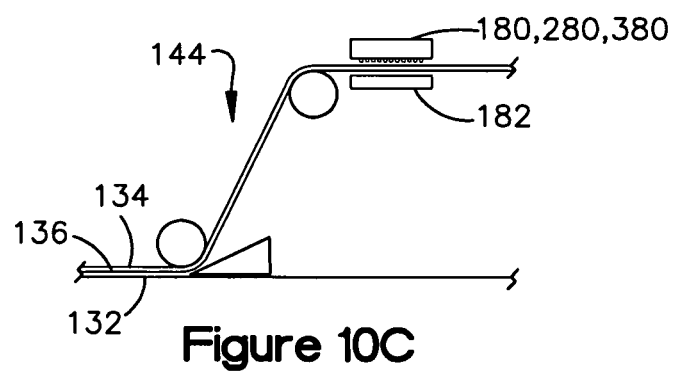
Figure 10D:
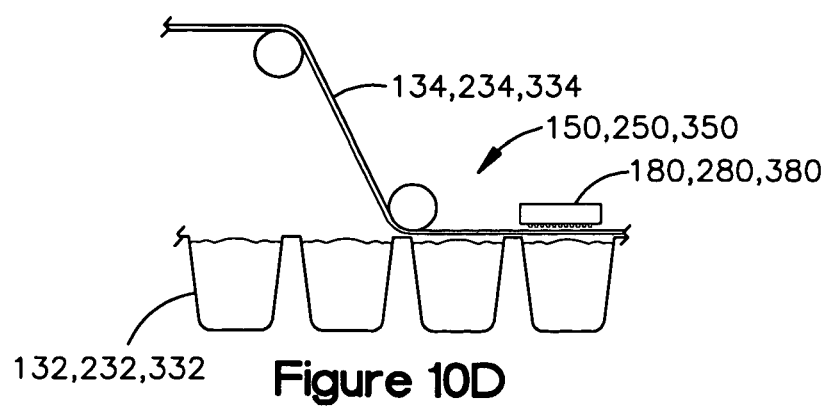

The present invention allows printing to be performed on the second layer 134/234/334 before delamination, after delamination, and/or after relamination. Specifically, for example, since the overlaying pre-delamination sections of the first layer 132/232/332 and the second layer 134/234/334 are reunited during relamination, the roll 130/230/330 can be provided with a preprinted second layer 134/234/334. (FIG. 10A.) Alternatively, the layer 134/234/334 can be printed upstream of the delaminating station 144/244/344 or downstream of the delaminating station 144/244/344 but upstream of the relaminating station 150/250/350. (FIG. 10B.) With particular reference to the first embodiment of the invention, pre-relamination printing can be combined with an adhesive-deadening step (i.e., varnish or degumming) to provide a grid patterned adhesive layer 136 such as is shown in FIG. 1E. (FIG. 10C.) The second layer 134/234/334 can also be printed after relamination although, in this case, the relamination registration provided by present invention provides no advantages. (FIG. 10D.)

The first layer 132/232/332 can also be printed in a similar manner, provided that any post-delamination printing does not interfere with receptacle-forming and/or filling steps.

As was indicated above, the forming stations 146, 246, 346 (and also the forming station 354) are preferably thermoforming stations and, more preferably, vacuum thermoforming stations, such as is shown schematically in FIGS. 11A-11C. With such a thermoforming process, a section of the first layer 132/232/332 is clamped and a heater 184/284/384 is positioned over the clamped section to heat the material to a suitable thermoforming temperature. (FIG. 11A.) Thereafter, the heater 184/284/384 is removed, and a mold 186/286/386 is moved so that the clamped heated section of the first layer 132/232/332 drapes thereover. (FIG. 11B.) The platen 188/288/388, by which the mold 186/286/386 is carried, forms an air tight seal pocket between the mold and the clamped section, and a vacuum pump 190/290/390 evacuates the air within the pocket whereby atmospheric pressure will push the sheet down over the mold 186/286/386 to form the receptacles 104/204/304 (and the receptacles 326 in the third embodiment). (FIG. 11C.)

During the preferred thermoforming step, the width and the length of the formed section of the first layer 132/232/332 do not significantly change, as the receptacles 104/204/304 are formed by a reduction of web thickness in the receptacle regions. (Although it is common for there to be a slight post-clamp contraction when the section of the first layer 102/202/302 is released from the clamps.) In this manner, the first portion 102 can be formed from a section of the first layer 132/232/332 having substantially the same length (L) and the same width (W) as the second portion 106/206/306.

The preferred forming station/step also makes the present invention especially compatible with multi-receptacle constructions. (Although single-receptacle containers are certainly possible with, and contemplated by, the present invention.) Furthermore, this forming technique allows container constructions wherein the receptacles 104/204/304 are not of the same size and/or shape as shown in FIGS. 9G-9I. Although a vacuum thermoforming process has been shown and described, the present invention can be used with other vacuum forming processes, as well as other forming processes such as, for example, hydroforming and/or pressure forming.

One may now appreciate that the construction of the container 100/200/300, the apparatus 128/228/338, and the corresponding manufacturing method, have many advantages. Specifically, for example, the containers 100/200/300 do not have any hinges between its portions 102/202/302 and 106/206/306. Additionally or alternatively, if the adhesive film 124/224/324 comprises a resealable adhesive, the container 100/200/300 can be recloseable without the use of latches, locks or other types of joints.

Regarding the apparatus/method, it allows the material for the container's first receptacle portion 102/202/302 (the first layer 132/232/332) and the material for the container's second lid portion 106/206/306 (the second layer 134/234/334) to be provided in single roll 130/230/330. The single supply roll 130/230/330 results in a single feed station 142/242/342 thereby eliminating multi-roll registration issues and plural-feed alignment problems. Also, the apparatus/method of the present invention allow different materials to be used for the receptacle portion 102/202/302 (the first layer 132/232/332) and the lid portion 106/206/306 (the second layer 134/234/334) of the container, something not possible with conventional clamshell container constructions. Further, the preferred thermoforming step assures proper inter-layer relamination thereby allowing, for example, pre-printing of the outer surface of the second layer 134/234/334 to label or otherwise mark the completed containers 100/200/300.

It may further be noted that the present invention can be used to make a plurality of products having a thermoformed first portion and/or second portion, regardless of whether this thermoforming results in receptacles.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

The invention claimed is:

1. A method for making a plurality of containers each having a first portion having one or more receptacles and a second portion covering the receptacle(s); said method comprising the steps of:
   feeding laminated layers including a first layer, a second layer, and an adhesive layer positioned between the first layer and the second layer;
   delaminating the first layer from the second layer;
   forming receptacles in the delaminated first layer; and
   relaminating the second layer with the formed first layer whereby the formed first layer forms the first portions of the containers, and the second layer forms the second portions of the containers.

2. A method as set forth in claim 1, wherein said feeding, delaminating, forming, and relaminating steps are performed at in-line stations.

3. A method as set forth in claim 1, wherein the first layer is a thermoformable material and wherein the forming step comprises a thermoforming step.

4. A method as set forth in claim 1, further comprising the step of filling the receptacles with a commodity after said forming step and prior to said relaminating step.

5. A method as set forth in claim 1, further comprising turning the first layer or the second layer after said delaminating step and before said relaminating step.

6. A method as set forth in claim 1, wherein receptacles are also formed in the second layer after the delaminating step and prior to the relaminating step.

7. A method as set forth in claim 1, further comprising the step of printing on the second layer, prior to said delaminating step, or after said delaminating step and prior to said relaminating step.

8. A method as set forth in claim 1, wherein the laminated layers are provided in a roll.

9. A method as set forth in claim 1, wherein said feeding step, said delamination step, said forming step, and said relamination step are performed by:
   a feeding station from which the first layer and the second layer, which are laminated together, are fed;
   a delaminating station whereat the first layer is delaminated from the second layer;
   a forming station whereat receptacles are formed in the delaminated first layer; and
   a relaminating station whereat the second layer is relaminated with the formed first layer whereby the formed first layer forms the first portions of the containers and the second layer forms the second portions of the containers.

10. A method as set forth in claim 9, wherein said forming station comprises a thermoforming station.

11. A method as set forth in claim 9, further comprising the step of forming receptacles in the second layer after the delaminating step and prior to the relaminating step, this step being performed by a second forming station whereat receptacles are formed in the delaminated second layer.

12. A method as set forth in claim 11, wherein the first forming station and the second forming station each comprise a thermoforming station.

13. A method as set forth in claim 9, further comprising the step of filling the receptacles with a commodity, this filling step being performed at a filling station which fills the receptacles with a commodity, the filling station being located downstream of the forming station(s) and upstream of the relaminating station.

14. A method as set forth in claim 1, wherein the laminated layers are provided in a roll comprising:
- the first layer;
- the second layer; and
- the adhesive layer between the first layer and the second layer;
- the adhesive layer being a pattern corresponding to the desired positioning of the receptacles in the finished containers.

15. A method as set forth in claim 14, wherein the adhesive layer is in a striped pattern corresponding to the receptacle-surrounding areas on the first portion.

16. A method as set forth in claim 14, wherein the adhesive layer is in a grid pattern corresponding to the receptacle-surrounding areas on the first portion.

17. A method as set forth in claim 14, wherein the adhesive layer comprises a pressure sensitive adhesive and/or a heat-activated adhesive.

18. A method as set forth in claim 14, wherein the adhesive layer comprises a dry peel adhesive that can be reactivated after delamination for relamination.

19. A method as set forth in claim 1, further comprising the step of cutting the relaminated layers to produce the plurality of the containers, each container comprising:
- a first portion having one or more thermoformed receptacles and having an inner surface with areas defining the receptacles and areas surrounding the receptacles;
- a second portion overlying the first portion and covering the receptacles, and having an inner surface with areas aligned with the receptacle-surrounding areas of the inner surface of the first portion; and
- an adhesive film on the inner surface of the first portion which connects the receptacle-surrounding areas with the aligned areas on the inner surface of the second portion;

wherein the adhesive film also covers the receptacle-defining areas of the inner surface of the first portion.

20. A method as set forth in claim 1 further comprising the step of cuffing the relaminated layers to produce a plurality of the containers, each container comprising:
- a first portion having one or more receptacles;
- a second portion overlying the first portion and covering the receptacles; and
- an adhesive film positioned between an inner surface of the first portion and an inner surface of the second portion and connecting certain aligned areas of these inner surfaces together; and
- wherein the first portion is thermoformed from a web section having substantially the same length and the same width as the second portion.

21. A method as set forth in claim 20, wherein the second portion is completely removable from the first portion after said relamination step.

22. A method as set forth in claim 21, wherein the adhesive film comprises a resealable adhesive whereby, in each container, the second portion is removable and recloseable relative to the first portion.

23. A method as set forth in claim 22, wherein, in the each container, the completely removed second portion is rejoinable to the first portion by only the adhesive film.

24. A method as set forth in claim 20, wherein the adhesive film covers at least areas aligned with the receptacle-surrounding areas.

25. A method as set forth in claim 24, wherein the adhesive film covers only the areas aligned with the receptacle-surrounding areas.

26. A method as set forth in claim 24, wherein the adhesive layer comprises heat-activated patches occupying certain sections of the receptacle-surrounding areas and pressure-sensitive adhesive patches occupying other sections of the receptacle-surrounding areas.

* * * * *